United States Patent Office 3,368,984
Patented Feb. 13, 1968

3,368,984
PROCESS FOR THE PRODUCTION OF POLY-
ACETAL FROM TERMINAL DIOLEFIN DI-
OXIDES AND PRODUCT
Friedrich August Fries, Marl, Germany, assignor to
Chemische Werke Huls Aktiengesellschaft, Marl,
Kreis Recklinghausen, Germany, a corporation of
Germany
No Drawing. Filed May 6, 1964, Ser. No. 365,480
Claims priority, application Germany, Oct. 2, 1963,
C 31,028
7 Claims. (Cl. 260—2)

ABSTRACT OF THE DISCLOSURE

Polyacetals are formed by reacting terminal diolefin dioxides such as those obtainable by epoxidation of terminal diolefins such as 1,2;5,6-diepoxyhexane, 1,2;5,6-diepoxy-2,5-dimethylhexane and 1,4-dimethylenecyclohexane dioxide with an acid agent such as sulfuric acid, phosphoric acid, zinc chloride, iron chloride and borotrifluoride, preferably in the presence of an inert solvent at a temperature within the range from −10° to +40° C. The polyacetals are characterized by adhesiveness to smooth glass plates and polished metals and their solutions may be used to form transparent films.

---

It has been discovered that polyacetals are formed when terminal diolefin dioxides are treated with acid agents.

Suitable terminal diolefin dioxides for use in the process are such symmetrical or unsymmetrical compounds as are obtainable by epoxidation of terminal diolefins such as 1,2;5,6-diepoxyhexane, 1,2;5,6-diepoxy-2,5 - dimethylhexane and the like. Cyclical compounds, especially the p-dimethylenecyclohexanedioxide obtainable from the 1,4-dimethylenecyclohexane are preferred but aliphatic terminal diolefin dioxides react surprisingly well in the process of the present invention to the production of the corresponding polyacetals.

Acids such as sulfuric acid, phosphoric acid and especially Lewis acids such as zinc chloride, iron chloride and especially borotrifluoride are suitable for use in the process.

The reaction takes place when the acid agent is permitted to act in a suitable manner with or upon the diepoxide. The reaction preferably is carried out at a low temperature, suitably between −10° and +40° C. and preferably between −10° and +20° C.

It has been found to be especially advantageous to carry out the reaction in the presence of a solvent. This permits not only an easy control of the reaction but also an avoidance of local over concentration of the catalyst and results in a generally uniform product. It also facilitates easy separation of the product from the catalyst. It has proved to be advantageous when a solvent is used, to use the catalyst also in liquid form i.e. dissolved form. A preferred catalyst is borofluoride etherate dissolved in ether.

The solvent for the reaction must be non-reactive with either the starting materials, the intermediate products or the end products and must also be inert to the acid agent. Water is excluded. Suitable solvents are e.g. dry ether, dioxane, cyclohexane, benzene, toluene and chloroform.

A 10 to 30% solution of the diepoxide preferably is used. The acid agent may be used in an amount within the range from 0.1 to 10.5 and preferably from 0.5 to 5% by weight based upon the diepoxide. The reaction generally is substantially complete in from 5 to 30 minutes. Since the formation of the polyacetal is exothermic the cooling which is necessary at the start of the reaction and may be effected by ether reflux cooling is unnecessary near the end of the reaction.

The polyacetal when produced in dissolved form is readily isolated and recovered. The polyacetal generally precipitates from the ether solution and may be separated, redissolved in a good solvent such as dioxane, the resulting solution deacidified, for example by shaking with sodium bicarbonate and the solvent distilled away.

The polyacetals vary from colorless to only slightly colored and, depending upon the degree of polymerization, vary from viscous to pulverizable clear resins. They are characterized by a special adhesiveness to smooth surfaces such as glass plates and polished metals and their solutions may be used to form transparent films. They can be worked in molten form or with a little solvent and when heavily charged with filler may serve as cement or binder.

The members of the new polymers appear to be bound as shown by the formula

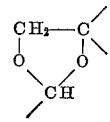

so that the polyacetal of p-dimethylenecyclohexane dioxide would have the following structure

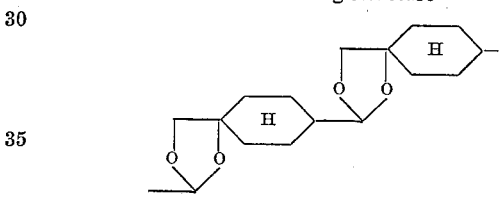

Example 1

2 cm.³ of a borofluoride-etherate (44%) was gradually added, dropwise, over a period of 15 minutes to a solution of 21 g. diepoxide of 1,4-dimethylenecyclohexane in 210 g. of dry ether. The vigorous reaction was held constant at a temperature of 20° C. by external cooling with ice water. After about 15 minutes a white, flocculent, slightly tacky resin precipitated out of the solution and quickly coagulated. This product was separated, taken up in dioxane and the solution neutralized with sodium bicarbonate. After removal of the solvent the product was a slightly colored resin. A dilute solution of the resin in dioxane gave a transparent, strongly adherent film on a glass plate.

The analysis of the polyacetal was as follows:

Molecular weight found: 680, calculated for 5 moles; 700 (97.2%).
Acetal content found: 268, calculated for 4 dioxolane rings/mole, 83.6% of theory.
Hydroxyl number found: 162.4 calculated for 2 OH groups (end groups), 84.4% of theory.

If instead of the borofluoride etherate a somewhat similar amount of sulfuric acid, phosphoric acid, zinc chloride, iron chloride or aluminum chloride is used, dioxane being used as the solvent, equally distinguished usable resins are produced.

Example 2

The process described in Example 1 was repeated but dioxane was used as the solvent. Depending upon the catalyst concentration different polymer products were obtained as shown in the following table.

| Borofluoride solution (44%) (cm.³) | Percent BF₃ based on diepoxide | Mol. Wt. | Degree of Polymerization |
|---|---|---|---|
| 2 | 4.2 | 250 | 1.8 |
| 3 | 6.3 | 610 | 4.35 |
| 4 | 8.4 | 900 | 6.4 |
| 5 | 10.5 | >900 | --- |

*Example 3*

21.3 g. of 1,2;5,6-diepoxy-2,5-dimethylhexane was dissolved in 210 g. of ether and polymerized by the addition of 2 ml. of borofluoride in ether (44%). The reaction mixture was held at 30° C. by ice cooling. After the end of the reaction the clear solution was washed neutral with sodium bicarbonate solution and distilled leaving a residue of 21 g. of a viscous, clear liquid having a molecular weight of 800 and an acetal number of 265.

I claim:

1. Process for the production of polyacetals which comprises contacting a terminal diolefin dioxide, free from other reactive groups, with an acid agent selected from the group consisting of sulfuric acid, phosphoric acid and Lewis acids.

2. Process as defined in claim 1 in which the diolefin dioxide and the acid agent are contacted in the presence of an inert solvent at a temperature within the range from −10° to +40° C.

3. Process as defined in claim 1 in which the diolefin dioxide in the form of a 10 to 30% solution thereof in an inert solvent is contacted with the acid agent in quantity amounting to from 0.1 to 10.5% of the weight of the diolefin dioxide at a temperature within the range from −10° to +40° C.

4. As a new product a polyacetal of a terminal diolefin dioxide produced by contacting a terminal diolefin dioxide, free from other reactive groups with 0.1–10.5% by weight of an acid agent of the group consisting of sulphuric acid, phosphoric acid and Lewis acids, at a temperature maintained within the range −10° to +40° C.

5. The new product defined in claim 4, in which the terminal diolefin dioxide is selected from the group consisting of p-dimethylene cyclohexane dioxide, 1,2;5,6-diepoxy-2,5-dimethylhexane and 1,2;5,6-diepoxyhexane.

6. As a new product the polyacetal of p-dimethylenecyclohexane dioxide producible by contacting diepoxide of 1,4-dimethylenecyclohexane in an inert solvent with 0.1–10.5% by weight of an acid agent selected from the group consisting of sulphuric acid, phosphoric acid and Lewis acids at a temperature maintained at from about −10° to about +40° C., for at least 5 minutes, said polyacetal having a molecular weight of from about 250 to about 900.

7. As a new product the polyacetal of 1,2;5,6-diepoxy-2,5-dimethylhexane producible by contacting 1,2;5,6-diepoxy-2,5-dimethylhexane with from 0.1 to 10.5% by weight of an acid agent selected from the group consisting of sulphuric acid, phosphoric acid and Lewis acids, in an inert solvent, at a temperature maintained at from about −10° to about +40° C., for at least 5 minutes, said polyacetal having a molecular weight of about 800.

No references cited.

WILLIAM H. SHORT, *Primary Examiner.*

T. PERTILLA, *Assistant Examiner.*

UNITED STATES PATENT OFFICE
CERTIFICATE OF CORRECTION

Patent No. 3,368,984                      February 13, 1968

Friedrich August Fries

It is hereby certified that error appears in the above numbered patent requiring correction and that the said Letters Patent should read as corrected below.

Column 4, line 6, after "40° C." insert -- in the presence of a non-reactive solvent. --.

Signed and sealed this 15th day of April 1969.

(SEAL)
Attest:

Edward M. Fletcher, Jr.                      EDWARD J. BRENNER
Attesting Officer                           Commissioner of Patents